Patented June 20, 1950

2,512,470

UNITED STATES PATENT OFFICE 2,512,470

FLATTING AGENT AND COMPOSITION CONTAINING THE SAME

Albert Saunders, Maplewood, N. J., assignor to Interchemical Corporation, New York, N. Y., a corporation of Ohio No Drawing. Application June 28, 1947, Serial No. 757,943

5 Claims. (Cl. 106—173)

1

This invention relates to new flatting agents particularly useful in the matte coating compositions of the laquer and synthetic resin type.

While many protective and decorative finishes are glossy, it is often desired to obtain finishes which are more or less matte and free from specular reflection, either for the decorative effect (as in furniture finishes) or for the utilitarian effect (as in finishes for photographic devices, where a non-reflecting surface is essential). Such an effect can be obtained by the use of very high percentages of pigment (e. g. flat wall paints, automobile undercoaters); but it is often desirable to get the same effect without loading the film with pigment either because the film properties of a lightly pigmented finish are desired, or because a transparent finish is desired.

To obtain this effect, the coating composition may be designed with an unbalance between the various film-forming ingredients and solvents, so that, on drying, a portion of the film is precipitated while the rest of the materials are still in solution. A very satisfactory flatting effect may be obtained in this fashion, and by careful compounding with certain classes of ingredients, exceedingly tough, transparent dull films are often obtainable. However, the method is not applicable to those classes of film-forming materials which cannot be precipitated and retain toughness of film. Furthermore, even with the best flat finishes of this type, the degree of flatness varies with the drying conditions, and uniform results cannot be obtained unless drying conditions are maintained absolutely uniform. Due to the difficulties involved in maintaining absolutely uniform drying condition, this type of flat composition is used only in isolated instances.

The trade in general has adopted the use of powders which are relatively insoluble in the coating compositions, and which can be dispersed therein to yield films which are translucent because of the similarity in refractive index between the flatting agents and the film-forming solids, and are flat because of the fact that the insoluble flatting agents break up the light hitting the surface of the film. The flatting agents generally employed fall into two classes—inorganic transparent inerts, and organic flatting agents.

The common inerts are siliceous materials, such as infusorial earth, silica, silica gel, some talcs, etc. They are essentially pigments, capable of staying on the surface of coatings while wet and during film formation, and which are transparent because their refractive indices approach

2 those of the vehicles, and are able to produce effective flatting because of the uneven surface and uneven light reflection so formed. They have three principal disadvantages. First, they are never perfectly transparent when a film of very low reflectivity is wanted. Second, they settle very badly to hard dry cakes upon storage which stir in with difficulty. This appears to be a property associated with their particle size and shape. Finally, the films produced are essentially pigmented films, so that where high flexibility is desired, as in artificial leather, the films are unsatisfactory because they craze on flexing.

The common organic flatting agents comprise certain transparent uncolored metal soaps (e. g. magnesium, zinc, aluminum, and the alkaline earth metal soaps of fatty acids). These materials generally produce more transparent films than the inorganic flatting agents, since they are more nearly similar in refractive index to the film-forming agents. Because of their similarity in general constitution to the vehicles, they stay in suspension better, and when they settle into flocculates they are easily stirred back into uniform dispersions. Because of these advantages they are preferred over the inert flats for interior finishes and the like. However, these organic flatting agents have certain marked disadvantages. While they do not weaken a film as badly as the inerts, films containing these agents do show crazing when flexed, as on artificial leather, except in the case of the most soluble soaps, which are extremely difficult to handle. Certain of the soaps hydrolyze when the films containing them are exposed to water, causing an objectionable whitening of the film. Also, the soaps are all more or less soluble in hydrocarbon solvents, particularly at elevated temperatures, thereby suffering loss of flatness. Generally, these flatting materials cannot be used in finishes designed to be dried at elevated temperatures.

The known flatting agents of the soap type, cause much less trouble in oleoresinous varnishes, where the solvents are present in relatively small proportion, and are largely aliphatic hydrocarbons in character, than in lacquers and synthetic resin compositions, where larger proportions of more powerful solvents are used.

There has recently been developed a new type of flatting agent which has reasonably good resistance to solution in the solvents of lacquer and synthetic resin vehicles, while yielding tough films. These flatting pigments are soaps of hardened rosin (e. g. maleated rosin, phenol resin modified rosin, and the like), preferably coated with an originally water-soluble lacquer insoluble vehicle such as methyl cellulose. These are described in Auer U. S. Patent No. 2,363,489.

I have discovered how to prepare a flatting agent having good non-crazing properties and good solvent resistance. Our method of preparation consists in preparing the magnesium, zinc, aluminum, or alkaline earth metal soaps of Manila gum. These soaps of the highly acidic Manila gum may be used as flatting agents alone, or may be coated with an originally water-soluble lacquer-insoluble vehicle such as methyl cellulose, casein, or egg albumin, as is described in Auer, U. S. Patent No. 2,363,489. These substances, while acting to some extent as a binder for the pigment, also act to prevent solution of the pigment in organic solvents.

Manila gum, from which my novel flatting agents are prepared, is a naturally occurring high acid content resin, generally thought to contain as high as 80% of the complex resinous mancophalolic acid. Being highly acidic in nature it is readily soluble in strong alkali such as potassium or sodium hydroxide to give solutions of the alkali metal salts of the acid. These salt solutions are then reacted, under suitable conditions, with aqueous solutions of soluble aluminum, zinc, magnesium, or alkaline earth salts to precipitate the new flatting agents of the present invention. Examples of our invention are:

Example I

To 1216 grams of sodium hydroxide solution (containing 216 g. of sodium hydroxide) in a 5 liter flask, was added 72 grams of Manila gum with stirring and careful heating. After addition of the Manila gum was complete, the mixture was boiled for about 30 minutes to effect solution of the resin. The solution of the sodium salt was then added to an additional 1000 grams of water and this solution heated for 30 minutes at 100° F. with stirring, and a solution, containing 62.5 grams of aluminum sulphate dissolved in 270 grams of water and heated to 150° F., was added to the sodium salt solution with constant stirring until the solution would turn blue litmus paper to a slight pink color. The mixture was then heated to about 200° F. for about 10 minutes with gentle stirring and filtered hot. The precipitate on the filter was washed with hot water until the filtrate from such washings was free from soluble sulfates when tested with barium chloride solution. The residue on the filter was then dried to constant weight in an oven at 160° F. and pulverized. The resulting pulverized pigment could be ground into nitrocellulose lacquers, synthetic resins, enamels and oleoresinous varnishes to give flatting effects dependent upon the concentration of the flatting pigment used.

Example II

The zinc soap of Manila gum was prepared according to the procedure of Example I by replacing the aluminum sulphate solution with a zinc sulphate solution containing 29.5 g. of zinc sulphate dissolved in 270 g. of water.

Example III

The magnesium soap of Manila gum was prepared according to the procedure of Example I by replacing the aluminum sulphate solution with a magnesium sulphate solution containing 22 g. of magnesium sulphate dissolved in 270 g. of water.

Example IV

An aluminum soap of Manila gum was prepared as in Example I except that an aqueous solution of methyl cellulose (containing 7 grams of methyl cellulose in 80 grams of water) was added to the boiled and cooled (60° F.) sodium soap solution of Manila gum, and then the solution was precipitated with aluminum sulphate solution as in Example I. The precipitated product, consisted of pigment size particles of the aluminum soap of Manila gum coated with methyl cellulose and after filtering, washing, and drying was ready for incorporation in a coating composition.

Typical flat pigment pastes, containing the pigments of the present invention, and suitable for incorporation in lacquers, resins, and oleoresinous varnishes are:

A. *Nitrocellulose lacquers*

| | Parts by weight |
|---|---|
| Flatting agent of Example I | 15 |
| 5–6 sec. nitrocellulose (dry basis) | 3 |
| Petroleum naphtha (boiling point 165–175° C.) | 49.2 |
| Butyl acetate | 16.4 |
| Ethyl alcohol | 16.4 |

Grinding to effect dispersion of the pigment can be accomplished in a suitable mixer such as a pebble mill or ball mill. The resulting paste is incorporated into a lacquer containing sufficient additional nitrocellulose, plasticizer, resin, and solvent to make a final lacquer suitable for application on wood, metal, fabric, paper or other sources.

B. *Resin finishes*

| | Parts by weight |
|---|---|
| Flatting agent of Example I | 18 |
| Xylol | 69 |
| Ethyl alcohol | 9 |
| Butyl alcohol | 4 |

This composition, after thorough mixing in suitable grinding equipment, can be incorporated in various synthetic vehicles, such as, alkyd resins, alkyd-urea resin, alkyd-melamine resin, urea resin, and melamine resin vehicles, to produce coatings having a dull or non-specular sheen when applied over surfaces for which the particular resin is designed.

C. *Oleoresinous varnishes*

| | Parts by weight |
|---|---|
| Flatting agent of Example I | 22 |
| Mineral spirits | 64 |
| Alcohol | 9.5 |
| Butyl Alcohol | 4.5 |

After grinding in suitable equipment to effect dispersion, the resulting paste can be incorporated in oleoresinous vehicles for application on such surfaces as wood, metal, linoleum, fabric, etc. The degree of flatness or dullness desired is determined by the amount of flatting agent in final formulation.

The above examples are illustrations of the different embodiments of the present invention and should not be considered as limiting its scope.

I claim:

1. A product suitable for use as a flatting agent comprising a metallic salt of a raw, non-pyrolyzed resin, the particles of said salt being sufficiently large that films formed from coating compositions containing said particles will have a relatively flat surface, the metal being one from the group consisting of aluminum, magnesium, calcium, strontium, barium and zinc, and said resin being a Manila gum.

2. A product suitable for use as a flatting agent comprising a metallic salt of a raw, non-pyrolyzed resin, the particles of said salt being sufficiently large that films formed from coating compositions containing said particles will have a relatively flat surface, the metal being one from the group consisting of aluminum, magnesium calcium, strontium, barium and zinc, and said resin being a Manila gum, and said salt being coated with a film deposited from an aqueous solution of methyl cellulose.

3. A product suitable for use as a flatting agent comprising the aluminum salt of a raw, non-pyrolyzed Manila gum, the particles of said salt being sufficiently large that films formed from coating compositions containing said particles will have a relatively flat surface.

4. A coating composition which comprises a normally glossy drying non-aqueous organic film-forming vehicle, the films of which are dulled by the incorporation therein of a product comprising a metallic salt of a raw, non-pyrolyzed resin, the particles of said salt being sufficiently large that films formed from the said coating composition will have a relatively flat surface, the metal being one from the group consisting of aluminum, magnesium, calcium, strontium, barium and zinc, and said resin being a Manila gum.

5. A coating composition which comprises a normally glossy drying non-aqueous organic film-forming vehicle, the films of which are dulled by the incorporation therein of a product comprising a metallic salt of a raw, non-pyrolyzed resin coated with a film deposited from an aqueous solution of methyl cellulose, the particles of said salt being sufficiently large that films formed from the said coating composition will have a relatively flat surface, the metal being one from the group consisting of aluminium, magnesium, calcium, strontium, barium and zinc, and said resin being a Manila gum.

ALBERT SAUNDERS.

REFERENCES CITED

The following references are of record in the file of this patent:

UNITED STATES PATENTS

| Number | Name | Date |
| --- | --- | --- |
| 1,482,919 | Ellis | Feb. 5, 1924 |
| 2,075,025 | Dietz | Mar. 30, 1937 |
| 2,363,489 | Auer | Nov. 28, 1944 |
| 2,401,090 | Masburn | May 28, 1946 |